No. 863,613. PATENTED AUG. 20, 1907.
L. KRIEGER.
MEANS FOR OPERATING THE CONTROLLING SWITCHES OF ELECTRIC VEHICLES.
APPLICATION FILED JAN. 10, 1906.
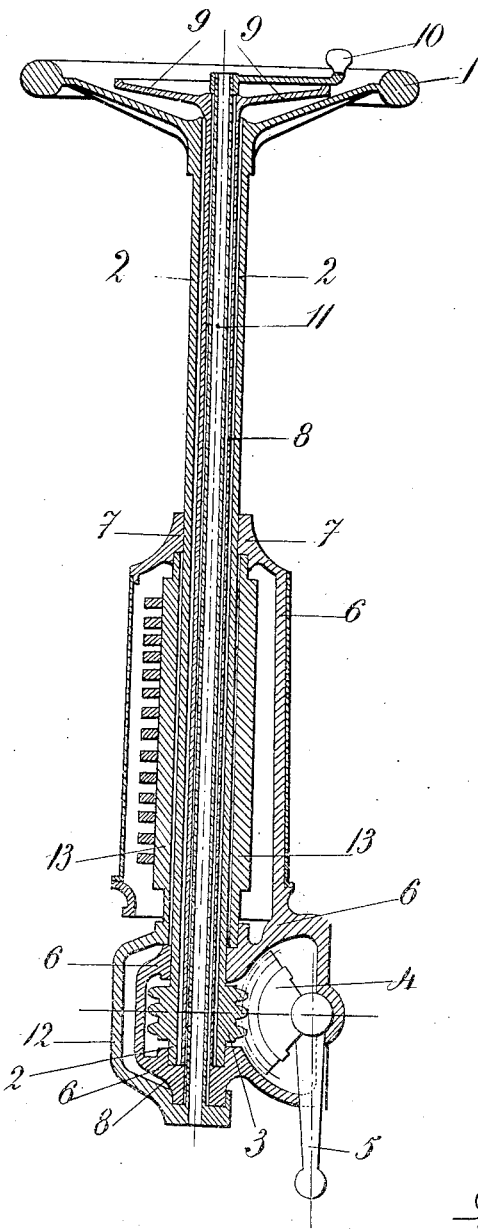

UNITED STATES PATENT OFFICE.

LOUIS KRIEGER, OF PARIS, FRANCE.

MEANS FOR OPERATING THE CONTROLLING-SWITCHES OF ELECTRIC VEHICLES.

No. 863,613.  Specification of Letters Patent.  Patented Aug. 20, 1907.

Application filed January 10, 1906. Serial No. 295,397.

*To all whom it may concern:*

Be it known that I, LOUIS KRIEGER, of 45 Boulevard Haussmann, Paris, France, engineer, have invented a new and useful Improvement in Means for Operating the Controlling-Switches of Electric Vehicles, which improvement is fully set forth in the following specification.

This invention has for its object to facilitate the working of the handle of the controlling switch of an electric vehicle and at the same time to insure the perfect exactitude of each different position of the switch.

With this object the handle is placed above the steering wheel and the movement of the handle is transmitted to the cylinder without any intermediary such as chains, gearing or the like, which might allow of play preventing the perfect working of the switch.

In order to fulfil these conditions, the switch and its control are coaxial with the pillar carrying the steering wheel. The connection between the handle situated just above the steering wheel and the switch is placed within the steering pillar. An upwardly turned arm placed outside this pillar directly actuates the switch cylinder also placed outside the steering pillar.

The accompanying drawing illustrates one method of carrying out this invention.

The steering wheel 1 is fixed to a pillar 2 which is provided with a worm 3 actuating a toothed quadrant 4, the axis of which carries the lever arm 5. The extremity of the steering pillar is stepped in the bottom of the casing 6; this casing which extends upwards serves to inclose the switch cylinder and also to support the steering pillar at 7. Fixed to the casing 6 and extending upwardly inside the pillar is a tube 8 which serves to support the plate 9, upon which the actuating handle 10 of the switch moves. This handle is keyed to a tube or rod 11, placed within the tube 8 and extending below the casing 6. The end of this tube 11 carries an upwardly turned arm 12 fixed directly to the switch cylinder 13.

It will be seen that if the displacement of the switch be limited to a smaller angle than 360° the arm 12, not being very large, might follow the movements of the handle 10 and so actuate the switch cylinder 13 without being impeded in its movement by the casing 6 inclosing the steering gear, its angular movement being limited on both sides by this casing. The connection between the handle and the cylinder is thus perfectly rigid and without play. Moreover the movement of the steering wheel 1 cannot, owing to want of lubrication, impart movement to the switch and vice versa, the fixed tube 8 being interposed between the pillar 2 and tube 11. Lastly, owing to the tube 8 being fixed, the plate 9 remains stationary during the movements of the steering wheel as well as of the handle 10 and cannot lead the driver to make a mistake.

Having now particularly described and ascertained the nature of my said invention and in what manner the same is to be performed, I declare that what I claim is:

1. A tubular steering pillar, a switch control arranged coaxially within the pillar, a fixed tube between the control and pillar, a connection between the pillar and steering gear, and an arm rigidly connecting the control and the switch cylinder.

2. The combination with a steering pillar of a fixed inner tube coaxial with it, a tube or rod passing through this tube and projecting above and below it and carrying at one end a handle and at the other an upwardly extending arm fast with the switch cylinder, substantially as described.

3. A tubular steering pillar, a fixed inner tube coaxial with it and carrying above an indicator plate, a switch control arranged within the tube and provided above the indicator plate with an operating handle and at the lower extremity with an upwardly extending arm rigidly connected to the switch cylinder.

4. The combination with a switch cylinder, a steering pillar arranged coaxially therewith, and a connection between the lower end of the pillar and the steering gear, of a fixed tube arranged within the pillar and provided above with an indicating plate, a switch control arranged within the tube and provided above the indicating plate with an operating handle and below with an arm extending upwardly outside the pillar and forming a rigid connection between the control and the switch cylinder.

In testimony whereof I have signed this specification in the presence of two subscribing witnesses.

LOUIS KRIEGER.

Witnesses:
HANSON C. COXE,
GASTON DE MESTRAL.